United States Patent Office 3,574,145
Patented Apr. 6, 1971

3,574,145
ION-EXCHANGE RESINS FROM KETONE-DIALDEHYDE CONDENSATES
Jean-Pierre Quentin, Lyon, and Michel Ruaud, Rhone, France, assignors to Rhone-Poulenc S.A., Paris, France
No Drawing. Filed Mar. 18, 1969, Ser. No. 808,315
Claims priority, application France, Mar. 19, 1968, 144,422
Int. Cl. C08g 3/00
U.S. Cl. 260—2.1
2 Claims

ABSTRACT OF THE DISCLOSURE

Ion-exchange resins are made by introducing ion-exchange groups into polycondensates made by reaction of a dialdehyde with a ketone.

---

This invention relates to ion-exchange resins and their preparation.

The present invention provides new ion exchange resins consisting essentially of units of formula:

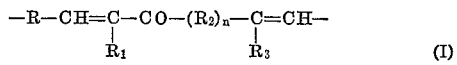

alone or combined with units of formula:

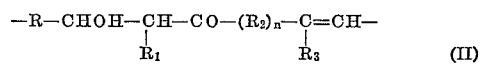

in which the radicals R, which may be identical or different, represent m-phenylene or p-phenylene or p-diphenylene radicals, these radicals being unsubstituted or substituted by halogen atoms; $n=0$ or 1; $R_1$ and $R_3$, which may be identical or different, represent hydrogen or aliphatic or cycloaliphatic radicals or, where $n=0$, together form a polymethylene chain; $R_2$ represents a radical:

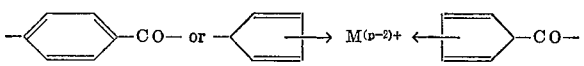

wherein M is a transition metal and $p$ is the degree of oxidation of this metal, the said units having ion-exchange groups attached thereto. These resins may be made up in the form of, for example, beads, films and membranes which also are within the scope of the invention.

These ion exchange resins are prepared by introducing ion (anion or cation) exchange groups into a resin consisting essentially of units of the Formula I and optionally of the Formula II.

These resins used as starting materials are polycondensates prepared by reaction of a dialdehyde of the formula:

with a ketone of the formula:

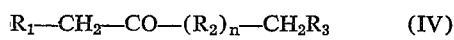

in a molar ratio from 0.5:1 to 2:1, preferably about 1:1.

If units of Formula II are desired in the polycondensate, the process must be carried out by interfacial polycondensation in the presence of a base, in a mixture of substantially immiscible solvents such that no one solvent dissolves all three of the said dialdehyde, ketone, and base (see Belgian Pat. No. 714,325). These polycondensates can optionally be subjected to a heat-treatment at a temperature above 100° C. It is also possible to use such a dialdehyde-ketone polycondensate which has been cross-linked by any known method, for example by reaction with a compound containing several olefinic double bonds such as divinylbenzene, a tetravinylsiloxane, or another compound containing several vinyl radicals.

The attachment of the ion exchange groups to the starting polycondensate may be effected by any known method. The various methods of attaching ion exchange groups mentioned in the works of R. Kunin (Ion Exchange Resins, 1958) and F. Helferich (Ion Exchange, 1962) may, for example, be used.

When the ion exchange resins of the invention are insoluble and infusible it is necessary to effect the attachment of the ion exchange groups to the starting polycondensate which has already been shaped, if it is desired to obtain an article of the same shape consisting of an ion exchange resin.

Where, however, the ion exchange resins of the invention are soluble in water or in an organic or inorganic solvent, they can for example be rendered insoluble, preferably after shaping, by a simple heat treatment above 90° C., in the presence of crosslinking agents or of concentrated sulphuric acid.

Suitable cation exchange groups which can be attached to the resins of the invention are carboxylic sulphonic, phosphonic, phosphinic and arsenic groups. Preferably, the sulphonic group is attached, for example by reaction of the resin with sulphuric or chlorosulphuric acid. A preferred process for the preparation of a cation exchange resin according to the invention consists of sulphonating a dialdehyde/ketone polycondensate as aforesaid with an alkali metal bisulphite. The reaction may be advantageously effected by simply bringing the dialdehyde/ketone polycondensate into contact with an aqueous solution of sodium bisulphite at a temperature of 20° to 150° C., preferably between 70 and 100° C., the pH being between 3 and 7 and the ratio of the number of molecules of sulphonating agent (i.e. molecules of metabisulphite) to the total number of units of Formulas I and II in the polycondensate being greater than 1.3:1. The use of aqueous media at high temperatures up to 150° C. necessarily implies sulphonation under pressure. The resin is obtained in the acid form by reaction of the product with an acid (e.g. a strong inorganic acid such as sulphuric acid) and removal of the various inorganic materials present. The particular value of this preferred process of preparation of ion exchange resins according to the invention is that it produces soluble resins which can easily be shaped, especially into membranes.

Suitable anion exchange groups which can be attached include ammonium, e.g. tertiary amine and especially quaternary ammonium groups, phosphonium groups and sulphonium groups. Non-ionised groups such as amines and sulphonamides are also suitable.

Various processes for the preparation of anion exchange resins according to the invention may be used. For example, the polycondensate may be chloromethylated with monochloromethyl ether, preferably in the presence of a Friedel-Crafts catalyst, and the product can then be reacted with an amine, e.g. a tri(lower alkyl)-amine, ammonia, a phosphine, an organic sulphide, or a sulphonamide still containing at least one hydrogen atom attached to the nitrogen.

According to a preferred process for the preparation of anion exchange resins according to the invention a dialdehyde/ketone polycondensate is brought into contact with a secondary amine, e.g. a di(lower alkyl)-amine, pyrrolidine, piperidine or morpholine, at a temperature above 20° C. and below the temperature of degradation of the reagents, and generally not above 100° C. The amine may be used in solution or more preferably in the undiluted state. A resin which carries amine groups and has a skeleton consisting of units of Formulas I and II is thus obtained. This resin may be used as such or can optionally be subjected to a quaternisation with alkyl monohalides or polyhalides, preferably a lower alkyl halide, a phenyl(lower alkyl)halide, or a bis-halo(lower alkyl) benzene, according to the known methods of quaternisation. Methyl, ethyl, propyl, butyl, pentyl or hexyl chlorides, the bis(chloromethyl)benzenes, and polyepichlorhydrin can advantageously be used as alkyl halides.

The particular value of this preferred process for the preparation of anion exchange resins is the same as in the case of the process for the preparation of sulphonic resins starting from a bisulphite, namely that it gives soluble products which can easily be shaped.

Other methods by which the ion exchange resins of the invention can be made include (a) reaction of the polycondensate with a p-di(lower alkyl)aminobenzaldehyde followed by quarternization with a halide such as one of those set out above; and (b) reaction of a polycondensate in which R contains halogen, with benzenesulphonamide or a (lower alkyl)benzenesulphonamide.

The ion exchange resins of the invention possess excellent heat stability, even up to 200° C. They resist alkaline and acid reagents well. When they have been suitably treated, they also resist aqueous and non-aqueous solvents.

The new resins may be used in all ion exchange operations, such as for example the extractions of ions present in a solution (demineralisation), or certain catalyst recoveries. They can also be used as membranes in electrodialysis apparatus, and especially as an electrode membrane (one of the two membranes of an electrodialyser close to the electrodes).

In order to assess the properties of certain of the membranes prepared, the following measurements were made:

(a) Electrical substitution resistance (measured only in Example 1). The electrical substitution resistance for a given membrane surface is the variation in the electrical resistance of a liquid column if the membrane is substituted for a slice of liquid of the same thickness and of the same surface area as the membrane, in a position at right angles to the axis of the column. In the present case this substitution resistance is measured in an 0.6 M aqueous KCl solution; it is expressed in ohm.cm.$^2$.

(b) Permeation selectivity (measured only in Example 1): this relates to the ability of the membrane to allow only cations to pass, with the exclusion of anions. This permeation selectivity is deduced by calculation from the measurement of the electromotive force existing between two aqueous KCl solutions respectively 0.4 M and 0.8 M, separated by the membrane in question which has beforehand been saturated with an 0.6 M aqueous KCl solution.

The formula giving the permeation selectivity as a percentage is:

$$\frac{P}{100} = \frac{\bar{t}^\oplus - t^\oplus}{1 - t^\oplus}$$

in which $t^\oplus$ is the transport number of K$^+$ in an 0.6 M aqueous KCl solution and $\bar{t}^\oplus$ is the transport number of K$^+$ in the membrane.

$\bar{t}^\oplus$ is given by the formula:

$$\bar{t}^\oplus = \frac{E + E_0}{2E_0}$$

in which $$E_0 = \frac{RT}{F} \ln \frac{a_1}{a_2}$$

wherein

R = the gas constant,
T = the absolute temperature,
F = the Faraday constant (96,489 coulombs per gram equivalent), $a_1$ = activity of the electrolyte in the higher concentration compartment (calculated from the concentration of the electrolyte and the activity coefficient), and
$a_2$ = activity of the electrolyte in the less concentrated compartment.

(c) Bursting resistance (measured only in Example 1). This is measured in accordance with standard specification PN AFNOR Q 0314 relating to testing paper and cardboard. A membrane fixed to a support frame, leaving a free surface of 10 cm.$^2$, is subjected to the effect of a hydraulic pressure via a rubber membrane. The hydraulic pressure (in bars) is measured after bursting, as is the sag in mm. of the curved-in membrane at the time of rupture.

(d) Theoretical exchange capacity. In the case of a cation exchange membrane this membrane is washed with a N/10 solution of sodium hydroxide and the amount of sodium hydroxide which has not been absorbed is measured. The number of mols of sodium hydroxide retained by the resin is deduced therefrom by difference; the ratio of the number of mols (optionally expressed in milliequivalents) to the weight of dry resin is the theoretical exchange capacity of the membrane.

In the case of an anion exchange membrane the theoretical exchange capacity is defined and measured similarly (the N/10 sodium hydroxide solution is replaced by N/10 sulphuric acid).

The following examples illustrate the invention.

EXAMPLE 1

This example illustrates the preparation of a cation exchange membrane.

(A) Preparation of the dialdehyde-ketone polycondensate 1 litre of 10% by weight aqueous sodium hydroxide solution followed by 23.2 g. of acetone are successively added to 53.68 g. of terephthaldehyde dissolved in 1 litre of benzene. The reaction mixture is stirred for one hour at 20° C., neutralised by adding acetic acid, and filtered. The residue is washed with water and then with acetone, and dired in vacuo a 60° C. 46 g. of a terephthaldehyde-acetone polycondensate are thus obtained.

(B) Sulphonation of the dialdehyde-ketone polycondensate 21.8 g. of the polycondensate prepared under (A) are suspended in 280 cm.$^3$ of an aqueous solution containing 53 g. of sodium metabisulphite. The mixture is stirred for 2 hours 30 minutes at 95° C. A mixture of 50 cm.$^3$ of water and 10 cm.$^3$ of concentrated sulphuric acid (66° Baumé) is then added. Heating at 95° C. is continued for 2 hours. The solution is concentrated to a volume of 100 cm.$^3$ by heating at 75° C., under a pressure of 20 mm. of mercury. 100 cm.$^3$ of dimethylsulphoxide are added. The mixture is again concentrated at 80° C., under a pressure of 20 mm. of mercury for 1 hour. 140 g. of a suspension are obtained, and this suspension is centrifuged for 15 minutes in a centrifuge revolving at 9,000 revolutions per minute, so as to remove the sodium salts present. 104 g. of a cation exchange resin in solution are thus obtained.

(C) Preparation of a membrane

A woven fabric of polyethylene glycol terephthalate (comprising 21 yarns of 65 deniers per linear centimetre both in the warp and in the weft) is wedged on the top of a glass plate with a 70μ thick wedge and stretched with a stainless steel frame. The usable surface of the woven fabric is a rectangle 12 cm. x 25 cm. A mixture of 2.5 g. of concentrated sulphuric acid (66° Baumé) and 5 cm.$^3$ of water is added to 25 g. of the solution prepared in (B). This solution is cast onto the woven fabric stretched on top of the glass plate. The whole is dried at 80° C. under a pressure of 100 mm. of mercury for 70 hours and the treatment is finished by heating at 100° C. for 9 hours. An ion exchange membrane having the following characteristics is thus obtained:

Exchange capacity: 1.8 milliequivalent/g.
Permeation selectivity: 73%
Substitution resistance: 1Ω. cm.$^2$
Thickness: 0.25 mm.
Bursting pressure: 6 bars
Sag on bursting: 11.5 mm.

After remaining for 7 days in N sulphuric acid at 70° C. the permeation selectivity is 70% and the substitution resistance 1Ω. cm.$^2$.

EXAMPLE 2

This example illustrates the preparation of an anion exchange resin.

5 g. of the polycondensate prepared according to Example 1 (paragraph A) are suspended in 20 g. of morpholine. The mixture is stirred for one hour 15 minutes at 70° C. A translucent solution is obtained, which is evaporated to dryness at 60° C., under a pressure of 100 mm. of mercury. The product is successively washed 10 times with 200 cm.$^3$ of water at a time and dried at 60° C., under a pressure of 100 mm. of mercury. It then has an exchange capacity of 1.60 milliequivalent/g., and contains 2.15% by weight of nitrogen.

EXAMPLE 3

This example illustrates the preparation of a film based on a dialdehyde-acetone polycondensate and the production of a cation exchange membrane by sulphonation of this film.

(A) Preparation of the film

A 10% by weight solution of the dialdehyde-acetone polycondensate prepared according to Example 1 (paragraph A) in hexamethylphosphotriamide is prepared. 0.01 g. of dicumyl peroxide and 0.2 g. 1,3,5,7-tetramethyl-1,3,5,7-tetravinylcyclotetrasiloxane are added to 10 g. of this solution. The solution is spread over a 100 cm.$^2$ glass plate with a casting device and the whole is heated to 80° C., in an oven under a reduced pressure of 100 mm. of mercury for 24 hours, and then to 120° C., under atmospheric pressure for 4 hours. The resulting film, which still contains 35% of its weight of hexamethylphosphotriamide, has a thickness of 0.3 mm.

(B) Sulphonation of the film 1 g. of the film prepared under (A) is immersed in a 30% by weight solution of chlorosulphuric acid in glacial acetic acid cooled to +10° C. The whole is then raised to one of a series of temperatures specified in the table below for 40 hours. The film which has been sulphonated in this way is then immersed for 1 hour in a 50% by weight aqueous solution of sulphuric acid and then for 1 hour in a 20% by weight sulphuric acid solution.

Various ion exchange resin membranes containing —SO$_3$H groups are thus obtained, in which the skeleton is a terephthaldehyde-acetone polycondensate crosslinked by 1,3,5,7-tetramethyl-1,3,5,7-tetravinylcyclotetrasiloxane. The membranes may be kept in pure water.

The table which follows shows the theoretical exchange capacity of the various membranes prepared and the amount of water retained in these membranes kept in water.

| Sulphonation temperature in degrees C. | Theoretical exchange capacity in milliequivalent/g. of dry resin | Percent by weight of water retained |
| --- | --- | --- |
| 25 | 1.1 | 27 |
| 40 | 1.7 | 45 |
| 60 | 1.9 | 50 |
| 80 | 2.4 | 54 |

EXAMPLE 4

A film is prepared in accordance with Example 3, paragraph A.

About 0.5 g. of this film still containing 35% of hexamethylphosphotriamide are immersed for 20 hours at 25° C., and then for 4 hours at 50° C., in a mixture of 15 g. of methoxychloromethane and 4 g. of anhydrous aluminium chloride. The film has been chloromethylated in this way, washed with methanol containing 5% of HCl and with water, and is then quaternised by immersion for 24 hours in a 25% aqueous solution of trimethylamine.

An ion exchange resin membrane is thus obtained in which the skeleton is a terephthaldehyde-acetone polycondensate crosslinked by 1,3,5,7-tetramethyl-1,3,5,7-tetravinylcyclotetrasiloxane, and which possesses substituents of the formula:

$$-CH_2-\overset{\oplus}{N}(CH_3)_3Cl^{\ominus}$$

The theoretical exchange capacity is 0.8 milliequivalent/g.

EXAMPLE 5

(A) Preparation of the dialdehyde-ketone polycondensate 50 cm.$^3$ of 10% by weight aqueous sodium hydroxide solution followed by 2.20 cm.$^3$ of acetone are successively added to 2.68 g. of terephthaldehyde dissolved in 50 cm.$^3$ of benzene, representing an excess of 50% based on the dialdehyde. The mixture is stirred for 1 hour at ambient temperature, neutralised with acetic acid, and filtered. The residue is washed first with water, then with acetone, and dried in vacuo at 60° C. 2.50 g. of a terephthaldehyde-acetone polycondensate possessing terminal —CO—CH$_3$ groups are obtained.

(B) Attachment of amine groups to the chain end 500 mg. of the polycondensate obtained above are dissolved in 25 cm.$^3$ of hexamethylphosphotriamide. 500 mg. of p-dimethylamino-benzaldehyde and 2 cm.$^3$ of 4% strength aqueous sodium hydroxide solution are added to this solution. Stirring is continued for 19 hours. A yellowish-orange polycondensate is precipitated by pouring the solution into 400 cm.$^3$ of a 2.5% strength aqueous solution of acetic acid. The precipitate is filtered off, washed with 500 cm.$^3$ of water, and then with 500 cm.$^3$ of acetone. After drying, 325 mg. of a polycondensate possessing terminal amine groups are obtained.

(C) Quaternising coupling 200 mg. of p-bis(chloromethyl)benzene dissolved in 20 cm.$^3$ of dimethylsulphoxide are added to these 325 mg. of polycondensate and the mixture is allowed to stand with stirring for 24 hours at 20° C. The resulting solution is cast on a 100 cm.$^2$ glass plate and dried at 70° C. in vacuo. An 0.1 mm. thick film is obtained. It consists of a resin in which the skeleton is a terephthaldehyde-acetone polycondensate joined by units of formula:

$$-\text{C}_6\text{H}_4-\overset{\oplus}{\text{N}}(\text{CH}_3)_2-\text{CH}_2-\text{C}_6\text{H}_4-\text{CH}_2\overset{\oplus}{\text{N}}(\text{CH}_3)_2-\text{C}_6\text{H}_4-\quad Cl^{\ominus}\ Cl^{\ominus}$$

The theoretical exchange capacity is 0.7 milliequivalent/g. The percentage by weight of water retained is 15%.

EXAMPLE 6

125 cm.$^3$ of 15% by weight sodium hydroxide solution and 1.85 cm.$^3$ of acetone are successively added to 5.075 g. of 2,5-dichloro-terephthaldehyde dissolved in 125 cm.$^3$ of benzene. When the same operations as in paragraph A of Example 1 are then carried out, 2,61 g. of polycondensate are obtained.

2 g. of this polycondensate, 2.5 g. of p-toluenesulphonamide and 2.40 g. of K$_2$CO$_3$ are dissolved in 50 cm.$^3$ of hexamethylphosphotriamide. The mixture is kept at 90° C. for 24 hours with stirring. A mixture of 5 cm.$^3$ of acetic acid and 200 g. of water and ice is added. The product is filtered off and washed with water and acetone. 0.40 g. of a resin are obtained, in which the skeleton consists mainly of units:

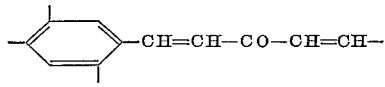

in which the benzene nuclei are disubstituted in positions 2 and 5 either by two chlorine atoms or by the two groups of formula:

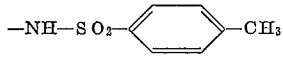

or by one chlorine atom and one group of formula:

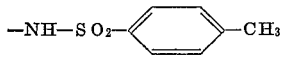

Its theoretical exchange capacity is 0.9 milliequivalent/g.

We claim:
1. An ion-exchange resin which consists essentially of units of formula:

$$—R—CH=CH—CO—(R_2)_n—CH=CH— \quad (I)$$

alone or combined with units of formula:

$$—R—CHOH—CH_2—CO—(R_2)_n—CH=CH— \quad (II)$$

in which the radicals R, which may be identical or different represent m-phenylene or p-phenylene or p-diphenylene radicals, these radicals being unsubstituted or substituted by halogen atoms; $n=0$ or 1; $R_2$ represents a radical of formula:

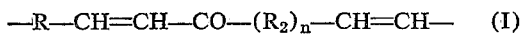

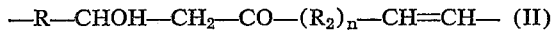

wherein M is a transistion metal and $p$ is the degree of oxidation of this metal, the said units having attached thereto ion-exchange groups selected from the class consisting of carboxylic, sulphonic, phosphonic, phosphinic, arsonic, ammonium, phosphonium, sulphonium, amine and sulphonamide groups, and being non-cross-linked or cross-linked by reaction with divinylbenzene, 1,3,5,7-tetramethyl-1,3,5,7-tetravinylcyclotetrasiloxane, or a bis-halo (lower alkyl) benzene.

2. An ion-exchange resin according to claim 15 in which $n$ is 0, the said units have attached thereto ion-exchange groups of formula:

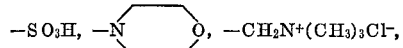

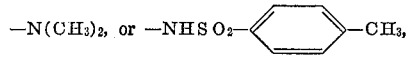

and the said units are non-cross-linked, or cross-linked via units of formula:

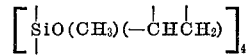

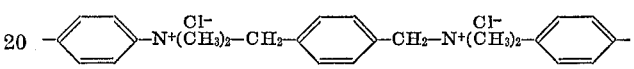

References Cited

UNITED STATES PATENTS

| | | | |
|---|---|---|---|
| 2,373,152 | 4/1945 | Thurston | 260—345 |
| 2,388,086 | 10/1945 | Rust | 260—64 |
| 2,469,472 | 5/1949 | Nachod et al. | 260—79 |

FOREIGN PATENTS

| | | |
|---|---|---|
| 966,297 | 8/1964 | Great Britain. |

OTHER REFERENCES

Lebsadze et al.: Soobshch. Akad. Nauk Gruz. SSR 39(1), 75–79 (1965), Chem. Abstr. supplied.

WILLIAM H. SHORT, Primary Examiner

M. GOLDSTEIN, Assistant Examiner

U.S. Cl. X.R.

260—2.2